WILLIAM B. BRADFORD.
Improvement in Plows.
No. 125,930.  Patented April 23, 1872.
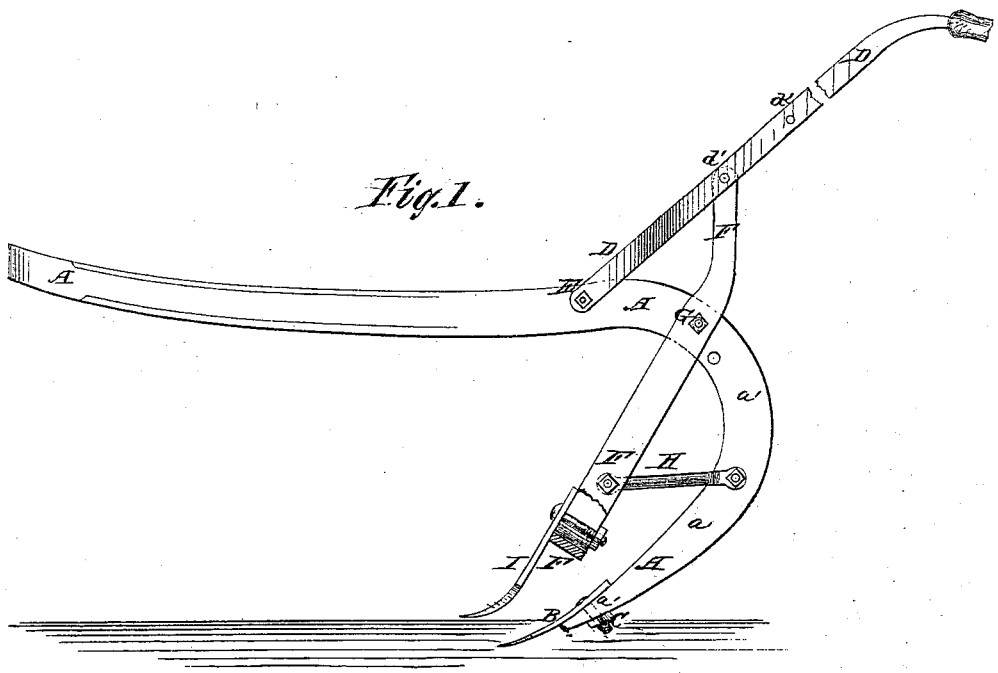
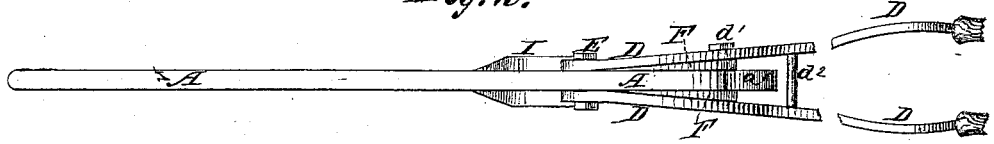

125,930

UNITED STATES PATENT OFFICE.

WILLIAM B. BRADFORD, OF CHARLOTTE, NORTH CAROLINA.

IMPROVEMENT IN PLOWS.

Specification forming part of Letters Patent No. 125,930, dated April 23, 1872.

Specification describing a new and useful Improvement in Plows, invented by WM. B. BRADFORD, of Charlotte, in the county of Mecklenburgh and State of North Carolina.

Figure 1 is a side view of my improved plow, part being broken away to show the construction. Fig. 2 is a top view of the same.

Similar letters of reference indicate corresponding parts.

My invention has for its object to furnish an improved plow, which shall be so constructed that it may be conveniently adjusted for use for subsoiling and for various other purposes for which plows and cultivators are now used, and which shall at the same time be simple in construction, conveniently adjusted, strong and durable, not being liable to decay in any of its parts; and it consists in the construction and combination of the various parts, as hereinafter more fully described.

A represents the plow-beam, the rear end $a'$ of which is curved downward to adapt it to serve as a standard for the subsoil-plow B, which is secured to it by a bolt, C, passing through a hole in the plow B and in the end of the standard $a'$. D are the handles, the forward ends of which are secured and pivoted to the rear part of the beam A, a little in front of the downward curve of its rear end, by a bolt, E, as shown in Figs. 1 and 2. The handles D are connected and held in their proper relative positions by rounds or bolts $d^1$ $d^2$. F is the plow-standard, which is slotted from its upper end almost to its lower end, or which may be formed of a bar bent together at its middle point to form the said slot. The arms of the standard F pass up upon the opposite sides of the beam A, and their upper ends are pivoted to the lower parts of the handles D by the lower round $d^1$ or by bolts. The standard F is secured to the beam A by a bolt, G, which passes through a hole in the arms or parts of the said standard F and through a hole in the beam A. Several holes are formed in the beam A to receive the bolt G, to enable the standard F to be adjusted to adapt the frame to its different uses by simply shifting the said bolt from one to another of said holes. The draft strain upon the standard F is sustained by the stay-rod or brace H, the forward end of which enters the slot in the standard F and is secured and pivoted to said standard by a bolt, as shown in Fig. 1. The rear end of the stay or brace-rod H is forked to receive the forward edge of the standard $a$, and is secured and pivoted to said standard by a bolt, as shown in Fig. 1. By this arrangement the stay or brace H supports the standard securely into whatever position it may be adjusted, and does not require to be loosened or detached to enable said standard to be adjusted. I is a shovel-plow, which is secured to the lower part of the standard F by a bolt passing through said plow and through the slot of said standard, and by a lug formed upon said plow and which enters said slot. By this construction the stay H is removed from the forward side of the plow-standard, which removes the tendency of the plow to clog.

Having thus described my invention, I claim as new and desire to secure by Letters Patent—

The arrangement of the slotted adjustable standard F and stay or brace-rod H with the pivoted handles D and with the plow-beam A $a'$, said parts being constructed and operating substantially as herein shown and described, and for the purposes set forth.

WILLIAM B. BRADFORD.

Witnesses:
T. H. BREW,
T. LAF. ALEXANDER.